(12) United States Patent
van Nee

(10) Patent No.: US 7,079,567 B2
(45) Date of Patent: *Jul. 18, 2006

(54) DIGITAL MODULATION SYSTEM USING EXTENDED CODE SET

(75) Inventor: Richard D. J. van Nee, De Meern (NL)

(73) Assignee: Agere Systems, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/207,474

(22) Filed: Jul. 29, 2002

(65) Prior Publication Data
US 2003/0076898 A1 Apr. 24, 2003

Related U.S. Application Data

(63) Continuation of application No. 09/064,188, filed on Apr. 22, 1998, now Pat. No. 6,452,958, which is a continuation-in-part of application No. 09/057,310, filed on Apr. 8, 1998, now Pat. No. 6,404,732, which is a continuation-in-part of application No. 08/688,574, filed on Jul. 30, 1996, now Pat. No. 5,862,182.

(51) Int. Cl.
*H04B 1/69* (2006.01)
*H04J 11/00* (2006.01)

(52) U.S. Cl. ................ 375/130; 375/140; 370/208

(58) Field of Classification Search ............. 375/130, 375/135, 136, 140, 142, 145, 146, 147, 150, 375/271, 280, 287, 299, 308, 329, 331, 332, 375/349, 284, 285
See application file for complete search history.

(56) References Cited

U.S. PATENT DOCUMENTS 4,176,316 A 11/1979 DeRosa et al. ............. 325/32
(Continued)

FOREIGN PATENT DOCUMENTS

DE 19646299 5/1998
(Continued)

OTHER PUBLICATIONS

Wilkinson, T, et al, "Minimisation Of The Peak To Mean Envelope Power Ratio Of Multicarrier Transmission Schemes By Block Coding," Proceedings Of The Vehicular Technology Conference, US, New York, Jul. 1995, pp. 825-829.

(Continued)

*Primary Examiner*—Kevin Kim

(57) ABSTRACT

A digital (de)modulation system uses a larger code set of M codes for N length codes, where M>N, to provide an increased data rate while maintaining the coding gain. For example, the system can use 16 different codes each having a length of 11 chips in a code set while the conventional M-ary keying systems use a code set size of 8 for 11-chip codes or 8-chip codes. By extending the code set size, the system increases the data rate of the system. With 16 codes and the ability to change the sign of the code to be transmitted, the system can encode 5 data bits on both I and Q, so a total of 10 data bits can be encoded per code symbol. In this embodiment, a code symbol contains an 11 chip code on a I modulation branch and an 11 chip code on a Q modulation branch. As such, using 11 chip codes and a chip rate of 11 Mhz, the system provides a data rate of 10 Mbps while conventional M-ary keying systems can only achieve 8 Mbps using the same code length and chip rate. By extending the code length, the processing gain is increased. The extended code set is not orthogonal, so a non-zero cross-correlation value results between the different codes of the code set. However, the resulting noise and multipath performance degradation can be kept small by choosing code sets with small cross-correlation values (nearly orthogonal). The magnitudes of both cross-correlation values and auto-correlation sidelobes should preferably be below half a code length. In some embodiments, the code set is derived from orthogonal codes which are modified to reduce the autocorrelation sidelobes associated with the orthogonal codes. In other embodiments, the code set is derived using a complementary code which provides low autocorrelation sidelobes and is modified to reduce the cross-correlation values between the codes.

62 Claims, 5 Drawing Sheets

U.S. PATENT DOCUMENTS

| | | | |
|---|---|---|---|
| 4,514,853 A | 4/1985 | Gutleber | 375/34 |
| 4,707,839 A | 11/1987 | Andren et al. | 375/1 |
| 4,901,307 A | 2/1990 | Gilhousen et al. | 370/18 |
| 5,103,459 A | 4/1992 | Gilhousen et al. | 375/1 |
| 5,109,390 A | 4/1992 | Gilhousen et al. | 375/1 |
| 5,151,919 A | 9/1992 | Dent | 375/1 |
| 5,187,675 A | 2/1993 | Dent | 364/715 |
| 5,218,619 A | 6/1993 | Dent | 375/1 |
| 5,309,474 A | 5/1994 | Gilhousen et al. | 375/1 |
| 5,353,352 A | 10/1994 | Dent | 380/37 |
| 5,357,454 A | 10/1994 | Dent | 364/727 |
| 5,533,013 A | 7/1996 | Leppanen | 370/18 |
| 5,809,060 A | 9/1998 | Cafarella et al. | 375/206 |
| 5,909,462 A * | 6/1999 | Kamerman et al. | 375/147 |
| 6,028,728 A * | 2/2000 | Reed | 360/51 |
| 6,134,264 A * | 10/2000 | Shiba et al. | 375/150 |
| 6,154,504 A * | 11/2000 | Ino | 375/265 |

FOREIGN PATENT DOCUMENTS

| | | |
|---|---|---|
| EP | 0828365 | 3/1998 |
| WO | WO9624198 | 8/1996 |

OTHER PUBLICATIONS van Nee, R, "OFDM Codes For Peak-To-Average Power Reduction And Error Correction," Global Telecommunications Conference (GLOBCOM), us, New York, Nov. 1996, pp. 740-744.

van Nee, R, "Multipath Effects On GPS Code Phase Measurements" Navigation Journal Of The Institute Of Navigation, vol. 39, No. 2, Summer 1992, pp. 177-190.

Aldis, J.P., et al, "Physical Layer Architecture And Performance In The Wand User Trial System," ACTS Mobile Communications, Summer '96, Granada, Spain, Nov. 27-29, 1996, pp. i-x, 196-203.

van Nee, R, "OFDM Codes For Peak To Average Power Reduction And Error Correction," IEEE, 1996, pp. 740-744.

van Nee, R, et al. "Performance Degradation Due To Code Tracking Errors In Spread-Spectrum Code-Division Multiple-Access Systems," IEEE Journal On Selected Areas in Communications, vol. 14, No. 8, Oct. 1996, pp. 1669-1679.

van Nee, R, et al. "Magic In Reality, Building The Wand Modem," ACTS Mobile Communications, Summer '97, Aalborg Denmark, Oct. 7-10, 1997, pp. 533-538, 775-780.

van Nee, R, et al. *OFDM For Wireless Multimedia Communications*, Chapter 10: "Applications of OFDM," pp. 229-241, Artech House, 2000.

Prasad, K.V., et al. "Data Transmission Using Complementary Sequence Sets," Fifth International Conference on HF Radio Systems and Techniques, Jul. 22-25, 1991, pp. 222-226.

Kretschmer, F.F. et al. "Doppler Properties Of Polyphase Coded Pulse Compression Waveforms," IEEE Transactions On Aerospace and Electronic Systems, vol. AES-19, No, 4, Jul. 1983, pp. 521-531.

Popovic, B. "Syntheses Of Power Efficient Mulitone Signals With Flat Amplitude Spectrum," IEEE Transactions on Communications, vol. 39, No. 7, Jul. 1991, pp. 1031-1033.

R. Deil-Imagine "JTIDS—An Overview of the System Design and Implementation," IEEE Plans 76, pp. 212-216.

R. VanNee et al., "Merged OFDM Physical Layer Specification for the 5 GHz Band," Doc: IEEE P802.11-98/72rl, Mar. 1998, pp. 1-27.

R. VanNee et al, "IEEE P8 02.11 Wireless LANs—Sharing Performance Evaluation for TGa PHY Submission," Doc: IEEE P802.11-98/71r1, Mar. 1998, pp. 1-5.

R. VanNee, "OFDM Physical Layer Specification for the 5 GHz Band," Doc: IEEE P802.11-98/12, Jan. 1998, pp. 1-12.

R. VanNee et al, "Summary of Merged Proposal," Doc: IEEE P802-11-98/72a, Mar. 1998, pp. 1-5.

R. VanNee, "OFDM Performance Comparison Submission Template," Doc: IEEE P802.11-98/73, Feb. 1998, pp. 1-2.

C. Andren, "Suggested 802.11-High Rate PHY Technique," Doc: IEEE P802.11-97/86, Sep. 1987, pp. 1-22.

C. Andren, "Proposed 802.11-High Rate PHY Technique," Doc: IEEE P802.11-97/144, Nov. 1987, pp. 1-30.

M. Webster, "Multipath Issues and Architectures," Doc: IEEE P802.11-98/37, Jan. 1998, pp. 1-40.

C. Andren, "2.4 GHz-High Rate PHY," Doc: IEEE P802. 11-98/46, Jan. 1998, pp. 1-270.

M. Webster et al, "Proposal for a High-Speed PHY for the 2.4 GHz Band," Doc: IEEE P802.11-98/47, Jan. 1998, pp. 1-93.

B. Hortos et al, "Empirical Benchmarks, High Rate PHY Example," Doc: IEEE P802.11-98/55, Jan. 1998, pp. 1-15.

B. Rood, "Implementation for a High-Speed PHY for the 2.4 GHz Band," Doc: IEEE P802.11-98/56, Jan. 1998, pp. 1-9.

D. Kawaguchi, "FH Interoperability Addition to Harris HS PHY Proposal," Doc: IEEE P802.11-98/114, Mar. 1998, pp. 1-8.

D. Kawaguchi, "FH Interoperabilty Addition to Harris HS PHY Proposal," Doc: IEEE P802.11-98/114a, Mar. 1998, pp. 1-17.

M. Webster, "DFE Packet-Error-Rate Minimization Using Precursor Sliding" Doc: IEEE P802.11-98/115, Mar. 1998, pp. 1-24.

C. Andren, "2.4 GHz High Rate PHY," Doc: IEEE P802. 11-98/116 Mar. 1998, pp. 1-39.

M. Webster, "Comparing Vector Modulations Using Similarity Transformations," Doc: IEEE P802.11-98/120, Mar. 1998, pp. 1-39.

C. Andren, "Direct Sequence Spread Spectrum Physical Layer Specification for the 2.4 GHz ISM Band," Doc: IEEE P802.11-98/134, Mar. 1998, pp, 1-24.

C. Andren, "IEEE 802.11 High Data Rate PHY Extensions," Doc: IEEE P802.11-97/25, Mar. 1997, pp. 1-17.

M. Golay, "Complementary Series," *IRE Transactions on Information.*, Apr. 1961, pp. 82-87.

R. Frank, "Polyphase Complementary Codes," [British Library 0193754673], IEEE, 1980 pp. 641-647.

J. Davis et al., "Peak-to-Mean Power Control in OFDM, Golay Complementary Sequences, and Reed-Muller Codes," *IEEE Transactions On Information Theory*, vol. 45, No. 7, Nov. 1999, pp. 2397-2417.

R. Sivaswamy, "Multiphase Complementary Codes," *IEEE Transactions On Information Theory*, vol. IT-24, No. 5, Sep. 1978, pp. 546-552.

L. Borner et al., "Periodic Complementary Binary Sequences," *IEEE Transactions On Information Theory*, vol. 36, No. 6, Nov. 1990, pp. 1487-1494.

A. Gavish et al., "On Ternary Complementary Sequences," *IEEE Transactions On Information Theory*, vol. 40, No. 2, Mar. 1994, pp. 522-526.

P. Spasojevic et al., "Complementary Sequences for ISI Channel Estimation," *IEEE Transactions On Information Theory*, vol. 47, No. 3, Mar. 2001, pp. 1145-1152.

H. Chen et al., "A Multicarrier CDMA Architecture Based on Orthogonal Complementary Codes For New Generations of Wideband Wireless Communications," *IEEE Communications Magazine*, Oct. 2001, pp. 126-135.

S. Tseng et al., "Asynchronous Multicarrier DS-CDMA Using Mutually Orthogonal Complementary Sets of Sequences," IEEE Transactions on Communications, vol. 48, No. 1, Jan. 2000, pp. 53-59.

C. Tseng et al., "Complementary Sets of Sequences," IEEE Transactions on Information Theory, vol. IT-18, No. 5, Sep. 1972, pp. 644-652.

J. Rubin et al., "JTIDS 11/DTMA—Command and Control Terminals," pp. 1-7.

C Cahn, "Spread Spectrum Applications and State-of-the-Art Equipments," [Lecture], pp. 5-1-5-111.

A. Viterbi, "Very Low Rate Convolutional Codes for Maximum Theoretical Performance of Spread-Spectrum Multiple-Access Channels," *IEEE Journal on Selected Areas in Communications*, vol. 8, No. 4, May 1990, pp. 641-649.

F. Ling et al., "Combined Orthogonal/Convolutional Coding for a Digital Cellular CDMA System," IEEE, 1992, pp. 63-66.

J. Holms, *Coherent Spread Spectrum Systems*, John Wiley and Sons, 1982, pp. 1-624.

H. Blasbalg, "A Comparison of Pseudo-Noise and Conventional Modulation for Multiple-Access Satellite Communications," *IBM Journal*, 1964, pp. 241-255.

L. Chang et al., "Performance of a CDMA Radio Communications System with Feed-Back Power Control and Multipath Dispersion," IEEE Globecom, '91, pp. 1017-1021.

R. Walton et al., "Near Maximum Likelihood Demodulation for M-ary Orthogonal Signaling," IEEE Globecom '91, pp. 5-7.

*Reference Data for Engineers: Radio, Electronics, Computer, and Communications*, 7th Edition, Howard W. Sams & Co. 1985, pp. 24-1-24-26.

W. Lindsey et al., *Telecommunication Systems Engineering*, Prentice-Hall, Inc., 1973, pp. 177-301.

Golomb, editor, *Digital Communications*, Prentice-Hall, Inc., 1964, pp. 1-115.

R. Ziemer et al., *Digital Communications and Spread Spectrum Systems*, McMillan Publishing Company, 1985, pp. v-vi.

R. Dixon, *Spread Spectrum Systems*, Second Edition, John Wiley & Sons, 1984 p. 214-290.

TIA/EIA Interim Standard: Mobile Station-Base Station Compatibility Standard for Dual-Mode Wideband Spread Spectrum Cellular System (TIA/EIA/IS-95), Jul. 1993, pp. 6-1-6-236.

\* cited by examiner

DIGITAL MODULATION SYSTEM USING EXTENDED CODE SET

This is a continuation of application Ser. No. 09/064,188, filed Apr. 22, 1998, now issued as U.S. Pat. No. 6,452,958, which is a continuation in part of U.S. patent application Ser. No. 09/057,310, filed Apr. 8, 1998, and issued Jun. 11, 2002 as U.S. Pat. No. 6,404,732, which is a continuation in part of U.S. patent application Ser. No. 08/688,574, filed Jul. 30, 1996, and issued Jan. 19, 1999 as U.S. Pat. No. 5,862,182, the disclosures thereof being incorporated herein by reference.

BACKGROUND OF THE INVENTION

1. Field of the Invention

This invention relates to wireless communication systems and, more particularly, to a digital modulation system that uses an extended code set to encode information.

2. Description of Related Art

A wireless communications channel can rarely be modeled as purely line-of-site. Therefore, one must consider the many independent paths that are the result of scattering and reflection of a signal between the many objects that lie between and around the transmitting station and the receiving station. The scattering and reflection of the signal creates many different "copies" of the transmitted signal ("multipath signals") arriving at the receiving station with various amounts of delay, phase shift and attenuation. As a result, the received signal is made up of the sum of many signals, each traveling over a separate path. Since these path lengths are not equal, the information carried over the radio link will experience a spread in delay as it travels between the transmitting station and the receiving station. The amount of time dispersion between the earliest received copy of the transmitted signal and the latest arriving copy having a signal strength above a certain level is often referred to as delay spread. Delay spread can cause intersymbol interference (ISI). In addition to delay spread, the same multipath environment causes severe local variations in the received signal strength as the multipath signals are added constructively and destructively at the receiving antenna. A multipath component is the combination of multipath signals arriving at the receiver at nearly the same delay. These variations in the amplitude of the multipath components is generally referred to as Rayleigh fading, which can cause large blocks of information to be lost.

Digital modulation techniques can be used to improve the wireless communication link by providing greater noise immunity and robustness. In certain systems, the data to be transmitted over the wireless communication link can be represented or encoded as a time sequence of symbols, where each symbol has M finite states, and each symbol represents n bits of information. Digital modulation involves choosing a particular code symbol from the M finite code symbols based on the data bits of information applied to the modulator. For M-ary keying schemes, $\log_2 M$ bits of information can be represented or encoded by M different codes or code symbols of at least M chips long. The codes are transmitted and received as several delayed replicas of the transmitted codes, and the receiver correlates the delayed versions of the received codes with the known codes.

Autocorrelation sidelobes show the correlation values between the known codes and the time shifted replicas of the received codes. For example, for a code (111-1), the autocorrelation for a zero shift is:

| code | 1 1 1 −1 |
|---|---|
| shifted code | 1 1 1 −1 |
| multiplication | 1 1 1 1 | correlation = sum of multiplied values = 4.

For a shift of one chip, the autocorrelation is:

| code | 1 1 1 −1 |
|---|---|
| shifted code | 1 1 1 −1 |
| multiplication | 1 1 −1 | correlation = sum of multiplied values = 1.

For a shift of 2 chips, the autocorrelation is:

| code | 1 1 1 −1 |
|---|---|
| shifted code | 1 1 1 −1 |
| multiplication | 1 −1 | correlation = sum of multiplied values = 0.

For a shift of 3 chips, the autocorrelation is:

| code | 1 1 1 −1 |
|---|---|
| shifted code | 1 1 1 −1 |
| multiplication | −1 | correlation = sum of multiplied values = −1.

Larger shifts give an autocorrelation value of zero, so the maximum autocorrelation sidelobe in this example has a value or magnitude of 1. In this example, −1's are used in the receiver instead of 0's. The autocorrelation sidelobes give an indication about multipath performance. If the autocorrelation sidelobes are large, several multipath components heavily interfere with each other. Cross-correlation refers to a code being correlated with different codes. As such, if the cross-correlation between codes is high, then the different codes will interfere with each other.

M-ary orthogonal keying is a form of digital modulation which provides good cross-correlation between codes by encoding data using orthogonal codes which do not interfere with each other. FIG. 1 shows a general block diagram of an M-ary orthogonal keying system 10. In this example, input data is scrambled by a scrambler 12 as specified in the current (1997) Institute of Electrical and Electronics Engineers (IEEE) 802.11 standard. The data is then provided to a serial-to-parallel converter 14 which converts the serial data into 8 parallel bits forming a data symbol. A first modulator 16 receives three (3) of the parallel bits and produces a code of length 8 chips from a look-up table, and a second modulator 18 receives three (3) of the parallel bits and produces a second code of length 8 from a look-up table. Chips are actually code bits, but they are called chips to distinguish them from data bits. In this implementation, one of the parallel bits is provided to a first exclusive-or (XOR) gate 20 which inverts the code from the first modulator if the bit has a value of one. Similarly, the last remaining bit is provided to a second XOR gate 22 which inverts the code from the second modulator 18 if the bit has a value of one. In this embodiment, the output $I_{out}$ of the XOR gate 20 is applied to signal circuitry 21 to convert all 0's to −1's for transmission. The circuitry 21 can also manipulate, convert and/or process $I_{out}$ before being used to modulate a carrier with frequency ω by mixer 24. The output $Q_{out}$ from the XOR 22 is applied to signal circuitry 23 to convert all 0's into −1's for transmission. The circuitry 23 can manipulate, convert and/or process $Q_{out}$ before being used to modulate a 90 degrees shifted carrier by mixer 26. In this particular embodiment, the first modulator 16 corresponds to the in-phase (I) component of the output signal, and the second modulator 18 corresponds to the quadrature (Q) component of the output signal.

In the system, the modulators 16 and 18 are performing 8-ary orthogonal keying or encoding because each receive 3 bits of information and chooses one out of 8 orthogonal codes. By having both I and Q components with different polarities, a total of 256 possible code combinations exist, so a total of 8 bits can be encoded into one orthogonal code. The code set in the 8-ary orthogonal keying system is based on eight (8) Walsh codes of 8 chips in length. Using the 8 chip Walsh codes in an M-ary orthogonal keying (MOK) system is advantageous because the 8 chip Walsh codes are orthogonal, which means they exhibit zero cross-correlation, so the 8 chip Walsh codes tend to be easily distinguishable from each other. However, using the 8 chip Walsh codes reduces the coding gain for the system of FIG. 1 to below 10, and the United States Federal Communications Commission (FCC) requires a processing gain of at least 10 for transmission systems operating in the 2.4 GHz Industrial, Scientific and Medical (ISM) band. Processing gain can be simply measured by the number of chips per code symbol. For the MOK system to achieve a processing gain of at least 10, the code length should be at least 10 chips. However, if the MOK system is designed for code lengths of 10 chips or more, the data rate drops to less than 10 Mbps.

Another M-ary keying scheme encodes data bits using a Barker code (like used for the IEEE 802.11 standard for 1 and 2 Mbit/s). The operation is similar to the previously described MOK system with length 8 codes, except that the code length for the non-orthogonal Barker sequences is 11. By choosing one out of 8 time shifted Barker codes of length 11 chips for the in-phase and quadrature components and changing polarities, a total of 8 bits per symbol can be encoded. However, a symbol now consists of 11 chips instead of 8, so for the same chip rate the effective data rate is a factor 8/11 lower. This means that with code lengths of 10 chips or more, you cannot achieve a data rate of 10 Mbps or more as in the case of length 8 codes.

SUMMARY OF THE INVENTION

The present invention involves a digital (de)modulation system which uses a larger code set of M codes for N length codes, where M>N, to provide an increased data rate while maintaining the coding gain. For example, the system can use 16 different codes each having a length of 11 chips in a code set while the conventional M-ary keying systems use a code set size of 8 for 11-chip codes or 8-chip codes. By extending the code set size, the system increases the data rate of the system. With 16 codes and the ability to change the sign of the code to be transmitted, the system can encode 5 data bits on both I and Q, so a total of 10 data bits can be encoded per code symbol. In this embodiment, a code symbol contains an 11 chip code on an I modulation branch and an 11 chip code on a Q modulation branch. As such, using 11 chip codes and a chip rate of 11 Mhz, the system provides a data rate of 10 Mbps while conventional M-ary keying systems can only achieve 8 Mbps using the same code length and chip rate. By extending the code length, the processing gain is increased. The extended code set is not orthogonal, so a non-zero cross-correlation value results between the different codes of the code set. However, the resulting noise and multipath performance degradation can be kept small by choosing code sets with small cross-correlation values (nearly orthogonal). The magnitudes of both cross-correlation values and auto-correlation sidelobes should preferably be below half a code length. In some embodiments, the code set is derived from orthogonal codes which are modified to reduce the autocorrelation sidelobes associated with the orthogonal codes. In other embodiments, the code set is derived using a complementary code which provides low autocorrelation sidelobes and is modified to reduce the cross-correlation values between the codes.

BRIEF DESCRIPTION OF THE DRAWINGS

Other aspects and advantages of the present invention may become apparent upon reading the following detailed description and upon reference to the drawings in which.

DETAILED DESCRIPTION

Figure 2:
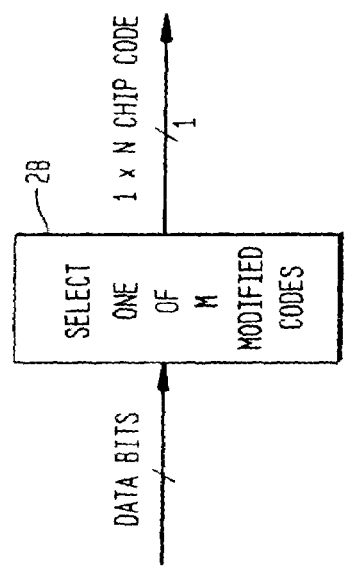
FIG. 2 shows a block diagram of a digital modulation system using an extended code set according to the principles of the present invention.

Illustrative embodiments of the digital (de)modulation system to achieve higher data rates while providing acceptable autocorrelation sidelobes and cross-correlation values for a wireless communications system is described below. FIG. 2 shows a digital modulator 28 according to the principles of the present invention. In response to data bits forming a data symbol, the modulator 28 chooses a corresponding one of M codes of length N, where M represents an extended number of codes of length N when compared to conventional M-ary keying systems. In conventional M-ary keying systems, the number of possible codes M is not more than the code length N in chips. In the present invention, the number M of codes is always larger than the code length N. In some embodiments, the code set can be derived from orthogonal codes which are modified to reduce the autocorrelation sidelobes associated with the orthogonal codes, and/or the code set is derived using a complementary code which provides low autocorrelation sidelobes and modified to reduce the cross-correlation properties of the code set.

For example, an extended code set is given below in Table 1 which is derived using complementary Barker codes. Complementary Barker codes are discussed in Robert L. Frank, "Polyphase Complementary Codes." IEEE Transactions On Information Theory, Vol. IT-26, No. 6, November 1980, pp.641–647. In this particular embodiment, the code set in table 1 is based upon 2 codes, which are cyclically shifted. For example, a code of length 4, such as {1 1 1 0} can be cyclically shifted by rotating the code to get three (3) other codes. If the code is shifted by one position to the right, the code {0 1 1 1} is created. Two shifts give {1 0 1 1}, and three (3) shifts give {1 1 0 1}. In this particular embodiment, the two codes are cyclically shifted over 8 chips to get a total of 16 different codes. One of the 2 codes is actually the length 11 Barker sequence that is used in the current 2 Mbps IEEE 802.11 standard which is {1-111-1111-1-1-1}. The other code {1-1-1111111-11} is a code which gives low cross correlation with the Barker code set and low autocorrelation. The maximum autocorrelation value of the code set in table 1 is 2, while the maximum cross-correlation magnitude is 5.

TABLE 1

Code set based on cyclic shifted codes

| 1  | -1 | 1  | 1  | -1 | 1  | 1  | 1  | -1 | -1 | -1 |
|----|----|----|----|----|----|----|----|----|----|----|
| -1 | 1  | -1 | 1  | 1  | -1 | 1  | 1  | 1  | -1 | -1 |
| -1 | -1 | 1  | -1 | 1  | 1  | -1 | 1  | 1  | 1  | -1 |
| -1 | -1 | -1 | 1  | -1 | 1  | 1  | -1 | 1  | 1  | 1  |
| 1  | -1 | -1 | -1 | 1  | -1 | 1  | 1  | -1 | 1  | 1  |
| 1  | 1  | -1 | -1 | -1 | 1  | -1 | 1  | 1  | -1 | 1  |
| 1  | 1  | 1  | -1 | -1 | -1 | 1  | -1 | 1  | 1  | -1 |
| -1 | 1  | 1  | 1  | -1 | -1 | -1 | 1  | -1 | 1  | 1  |
| 1  | -1 | -1 | 1  | 1  | 1  | 1  | 1  | 1  | -1 | 1  |
| 1  | 1  | -1 | -1 | 1  | 1  | 1  | 1  | 1  | 1  | -1 |
| -1 | 1  | 1  | -1 | -1 | 1  | 1  | 1  | 1  | 1  | 1  |
| 1  | -1 | 1  | 1  | -1 | -1 | 1  | 1  | 1  | 1  | 1  |
| 1  | 1  | -1 | 1  | 1  | -1 | -1 | 1  | 1  | 1  | 1  |
| 1  | 1  | 1  | -1 | 1  | 1  | -1 | -1 | 1  | 1  | 1  |
| 1  | 1  | 1  | 1  | -1 | 1  | 1  | -1 | -1 | 1  | 1  |
| 1  | 1  | 1  | 1  | 1  | -1 | 1  | 1  | -1 | -1 | 1  |

The code set of tables 2 and 3 are derived using modified orthogonal Walsh codes. For example, in the code set of table 2, the first 8 codes are length 8 Walsh codes, extended with 3 ones to get a length of 11. Further, the $4^{th}$, $7^{th}$ and $10^{th}$ chips are inverted. The second group of 8 codes is again the Walsh code set extended with 3 ones, but now the $4^{th}$, $6^{th}$ and $11^{th}$ chips are inverted.

TABLE 2

Code set based on modified Walsh codes

| 1 | 1  | 1  | -1 | 1  | 1  | -1 | 1  | 1  | -1 | 1  |
|---|----|----|----|----|----|----|----|----|----|----|
| 1 | -1 | 1  | 1  | 1  | -1 | -1 | -1 | 1  | -1 | 1  |
| 1 | 1  | -1 | 1  | 1  | 1  | 1  | -1 | 1  | -1 | 1  |
| 1 | -1 | -1 | -1 | 1  | -1 | 1  | 1  | 1  | -1 | 1  |
| 1 | 1  | 1  | -1 | -1 | -1 | 1  | -1 | 1  | -1 | 1  |
| 1 | -1 | 1  | 1  | -1 | 1  | 1  | 1  | 1  | -1 | 1  |
| 1 | 1  | -1 | 1  | -1 | -1 | -1 | 1  | 1  | -1 | 1  |
| 1 | -1 | -1 | -1 | -1 | 1  | -1 | -1 | 1  | -1 | 1  |

TABLE 2-continued

Code set based on modified Walsh codes

| 1 | 1  | 1  | -1 | 1  | -1 | 1  | 1  | 1  | 1  | -1 |
|---|----|----|----|----|----|----|----|----|----|----|
| 1 | -1 | 1  | 1  | 1  | 1  | -1 | 1  | 1  | 1  | -1 |
| 1 | 1  | -1 | 1  | 1  | -1 | -1 | -1 | 1  | 1  | -1 |
| 1 | -1 | -1 | -1 | 1  | 1  | -1 | 1  | 1  | 1  | -1 |
| 1 | 1  | 1  | -1 | -1 | 1  | -1 | -1 | 1  | 1  | -1 |
| 1 | -1 | 1  | 1  | -1 | -1 | -1 | 1  | 1  | 1  | -1 |
| 1 | 1  | -1 | 1  | -1 | 1  | 1  | 1  | 1  | 1  | -1 |
| 1 | -1 | -1 | -1 | -1 | -1 | 1  | -1 | 1  | 1  | -1 |

The code set of table 3 uses length 16 modified Walsh codes. This set has better cross correlation properties than the set based on two cyclic shifted codes; the maximum cross correlation value is 3, versus 5 for the cyclic shifted case. This means that the signal-to-noise performance of the code set in table 3 will be slightly better. However, the cross-correlation values for delayed code words are worse than those of the cyclic shifted set, which means that the multipath performance is slightly worse. The set of table 3 was obtained by multiplying the length 16 Walsh code set by the length 16 complementary sequence {1 1 1-1 1 1-1-1 1 1 1 1-1-1-1-11-1}. The length 16 codes were then reduced to length 11 codes by puncturing (i.e. removing) the $3^{rd}$, $6^{th}$, $9^{th}$, $12^{th}$ and $15^{th}$ elements of the codes.

TABLE 3

Code set based on modified and punctured length 16 Walsh codes

| 1  | 1  | -1 | 1  | -1 | 1  | 1  | 1  | -1 | -1 | -1 |
|----|----|----|----|----|----|----|----|----|----|----|
| 1  | -1 | 1  | 1  | -1 | -1 | -1 | 1  | -1 | 1  | 1  |
| 1  | 1  | 1  | 1  | 1  | -1 | 1  | -1 | -1 | -1 | 1  |
| 1  | -1 | -1 | 1  | 1  | 1  | -1 | -1 | -1 | 1  | -1 |
| 1  | 1  | -1 | -1 | 1  | -1 | 1  | 1  | 1  | 1  | 1  |
| 1  | -1 | 1  | -1 | 1  | 1  | -1 | 1  | 1  | -1 | 1  |
| 1  | 1  | 1  | -1 | -1 | 1  | 1  | -1 | 1  | 1  | -1 |
| 1  | -1 | -1 | -1 | -1 | -1 | -1 | 1  | 1  | -1 | 1  |
| 1  | -1 | 1  | -1 | -1 | -1 | 1  | 1  | 1  | 1  | -1 |
| 1  | 1  | -1 | 1  | 1  | -1 | 1  | -1 | 1  | -1 | -1 |
| 1  | -1 | -1 | 1  | 1  | 1  | 1  | 1  | 1  | -1 | -1 |
| 1  | 1  | 1  | 1  | -1 | 1  | -1 | -1 | 1  | 1  | -1 |
| 1  | -1 | -1 | 1  | -1 | -1 | -1 | -1 | -1 | -1 | -1 |
| 1  | 1  | 1  | 1  | -1 | -1 | 1  | -1 | -1 | 1  | -1 |
| 1  | 1  | 1  | -1 | -1 | 1  | -1 | 1  | -1 | -1 | 1  |
| 1  | -1 | -1 | -1 | -1 | 1  | 1  | -1 | 1  | -1 | -1 |

The modulator 28 can perform the derivation of the extended code set(s) using processing circuit implementing some logic to perform the derivation, or the modulator 28 can store the code set(s) in a look-up table. The modulator 28 can also store different sets of modified orthogonal codes depending on desired changes in operation or calculate different extended sets derived from different codes. In this embodiment, the data bits are shown as being received in parallel, and the code chips are shown as being produced serially. Depending on the application, the data bits can be received serially, and/or the code chips can be produced in parallel.

Figure 3:
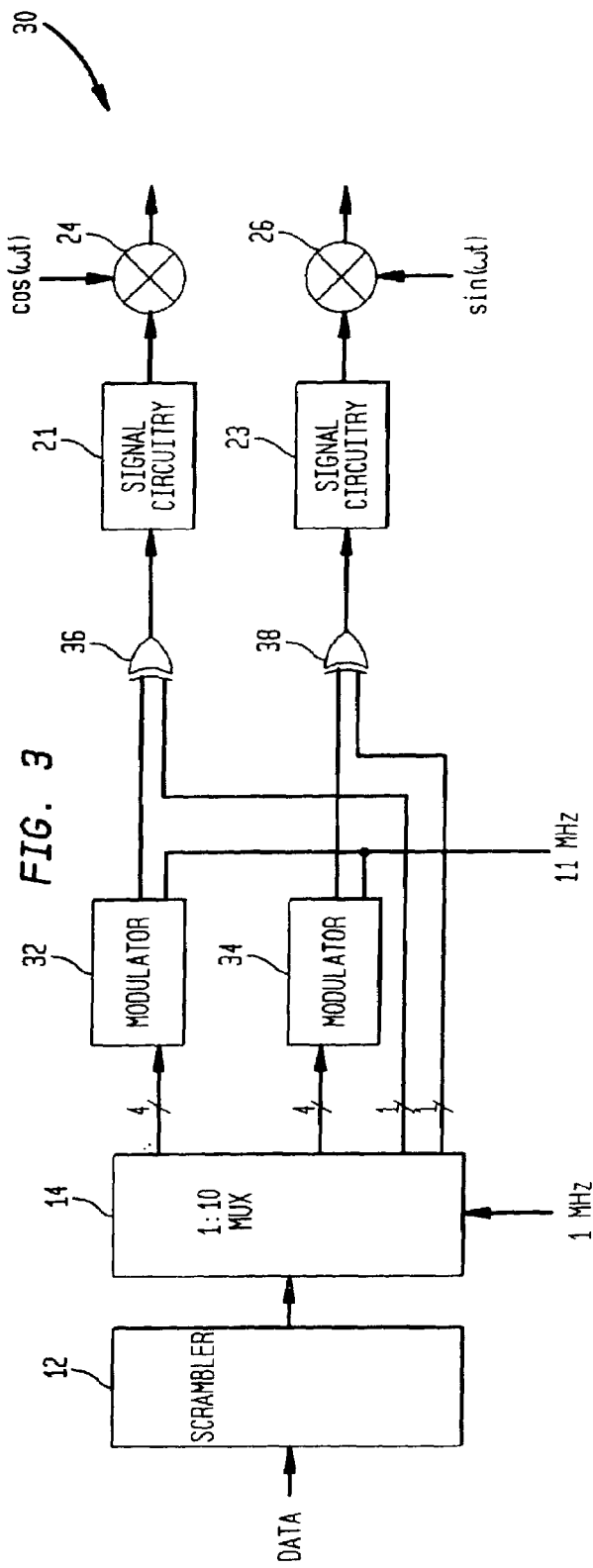
FIG. 3 shows a block diagram of an embodiment of a digital modulation system using the digital modulation system of FIG. 2.

FIG. 3 shows an embodiment of a digital modulation system 30 using modulators 32 and 34 to produce one of 16 codes of length 11 chips in response to 4 information bits from the serial to parallel converter 14. In MOK systems, the modulators respond to 3 information bits to produce one of eight (8) modified Walsh codes of length 8 chips. By using only 8 chip codes, the MOK systems fail to achieve a processing gain of 10 which is required by the FCC for the 2.4 GHz ISM band. To achieve the processing gain of 10, it is believed that at least 10 chips long codes should be used. That is why the length 11 Barker code is used in the current IEEE 802.11 standard for direct sequence spread-spectrum in the 2.4 GHz band. However, the system using 11 Barker codes is limited to 8 codes per set, thereby limiting the data rate.

In the operation of the embodiment of FIG. 3, the scrambler 12 receives data and scrambles the data according to the IEEE 802.11 standard. In other embodiments, the scrambler 12 may not be necessary, and the data can be manipulated by some other form of data conversion, interleaving or modification, or the data can be fed directly into the serial-to-parallel converter 14. In this embodiment, the serial-to-parallel converter 14 is a 1:10 multiplexer (MUX) which produces a data symbol of 10 data bits in parallel according to a 1 MHz clock signal. The ten bit data symbol is encoded into a I/Q code pair of 11 chip codes or codewords. Four (4) of the bits of the data symbol are provided to the first modulator 32 which produces a corresponding one of sixteen (16) length 11 codes from the extended code set according to the principles of the present invention. The first modulator 32 produces the length 11 code at a chip rate of about 11 MHz as dictated by an 11 MHz clock signal. In the above example, each symbol contains 10 data bits, which are encoded into independent I and Q codes of 11 chips. Chips are actually code bits, but they are called chips to distinguish them from data bits. In this embodiment, the first modulator 32 corresponds to the I phase modulation branch of the system 30 which produces the I component of the of the signal to be transmitted.

A second set of four (4) bits of the data symbol from the converter 14 is provided to the second modulator 34 which produces a corresponding one of 16 length 11 codes from the extended code set according to the principles of the present invention. The second modulator 34 corresponds to the Q phase modulation branch of the system 30 which produces the Q component of the of the signal to be transmitted. In response to the four data bits, the second modulator 34 also produces a length 11 code at a chip rate of about 11 MHz as dictated by the 11 MHz clock signal.

Of the remaining two of 10 bits of the data symbol from the serial to parallel converter 14, one is provided to a first XOR gate 36. If the bit is a 0, the first XOR gate 36 changes the polarity of the length 11 code from the first modulator 32. The resulting code $I_{out}$ is provided to signal circuitry 21 to change any 0's to −1's and perform any additional signal processing and/or conversion before being provided to the first mixer 24 to modulate a carrier of frequency ω. The last remaining bit is provided to a second XOR gate 38. If the bit is a 0, the second XOR gate 38 changes the polarity of the length 11 Walsh code from the second modulator 34. The resulting modified Walsh code $Q_{out}$ is provided to the signal circuitry 23 for any conversion and/or processing before being provided to the second mixer 26 to modulate a 90 degree shifted version of the carrier with frequency ω. If instead of 0's, −1's are used, the first and second XOR gates 36 and 38, can be replaced by multipliers to change the polarity of $I_{out}$ and $Q_{out}$. Subsequently, the $I_{out}$ modulated carrier and the $Q_{out}$ modulated carrier are combined and transmitted. As such, this particular embodiment of the system 30 partitions 10 bits of incoming data into 5 bits for the I branch and 5 bits for the Q branch. Four data bits on the I branch are encoded into a code of 11 chips from the extended code set, and four data bits on the Q branch are encoded in parallel into one of 16 11-chip codes. Because the last two bits encode information by determining the polarity of the 11 chip codes respectively, the system 30 encodes 10 data bits into 2 codes which are both picked from a set of 32 possible codes. In this example, there are 16 codes, which can be inverted to get 32 codes. With a symbol rate of 1 MSps and 10 bits/symbol, the data rate for the system 30 is 10 MBps.

Figure 4:
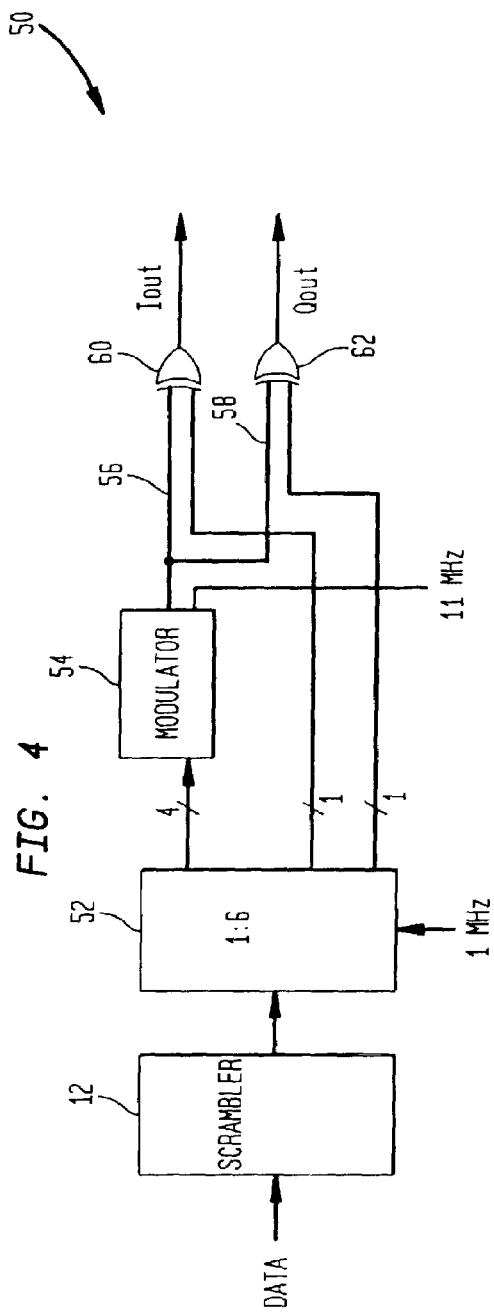
FIG. 4 shows a block diagram of another embodiment of the digital modulation system which can be used as the fallback mode for the, embodiment of FIG. 3.

FIG. 4 shows an embodiment of a extended code digital modulation system 50 which can be used as a fallback mode for the system 30 (FIG. 3). Once again, the input data is scrambled by the scrambler 12 according to the IEEE 802.11 standard. The data is provided to a serial to parallel converter 52. The serial to parallel converter 52 in this embodiment produces 6 bit data symbols in parallel at a data symbol rate of 1 MSps. From the 6 bit data symbol, four bits are received by a modulator 54 which encodes the 4 bits into one of 16 length 11 codes according to the principles of the present invention. The length 11 code is provided to both I and Q branches 56 and 58. In accordance with another inventive aspect of this particular embodiment, by providing the same code to multiple phase modulation paths or branches, this embodiment allows a fallback mode with independent phase modulation, such as quadrature phase shift keying (QPSK) or 8-phase shift keying (8-PSK), of the same code on the multiple phase modulation paths, such as the I and Q branches 56 and 58 in this embodiment. On the I branch 56, the 11 chip code is serially provided to a first XOR gate 60, and on the Q branch 58, the 11 chip code is serially provided to a second XOR gate 62. Of the two remaining bits from the serial to parallel converter 52, one bit goes to the first XOR gate 60 to adjust the polarity of the length 11 code and produce $I_{out}$ on the I branch 56, and the other bit goes to the second XOR gate 62 to adjust the polarity of the length 11 code and produce $Q_{out}$ on the Q branch 58. Depending on the implementation, if −1's are used instead of 0's, the first and second XOR gates 60 and 62 can be replaced by multipliers. As such, given data symbols of 6 bits/symbol and a symbol rate of 1 MSps, this embodiment provides a data rate of 6 Mbps.

Figure 1:
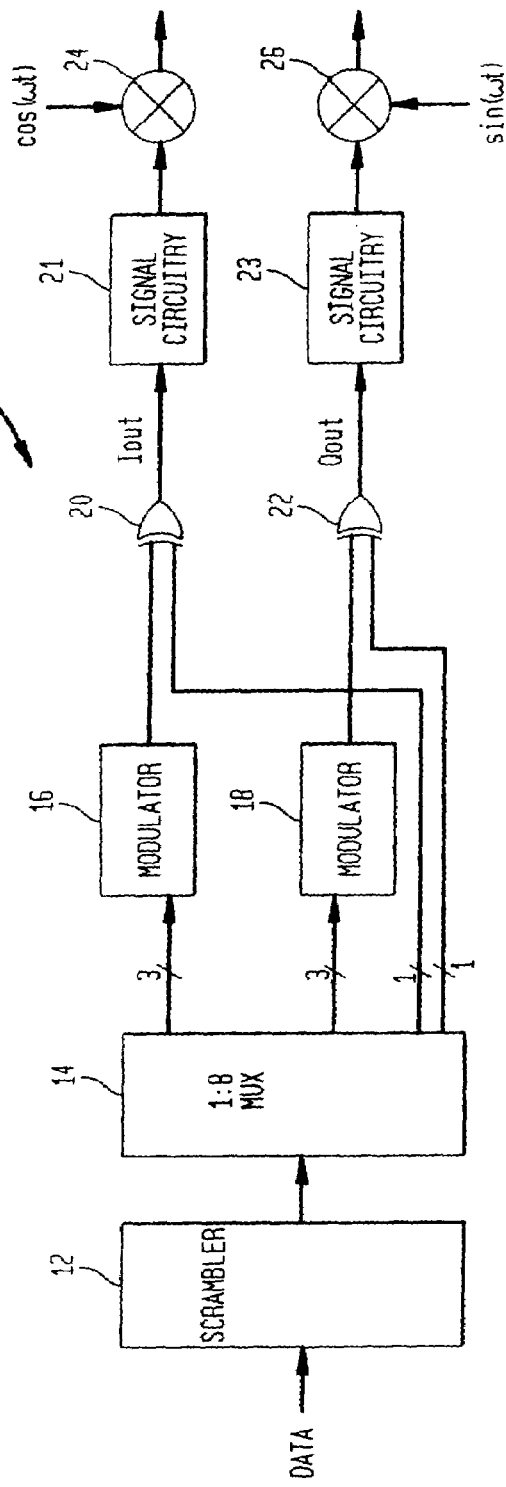
FIG. 1 shows a block diagram of a M-ary orthogonal keying (MOK) system using Walsh codes modified by a cover sequence (11111100)
Figure 5:
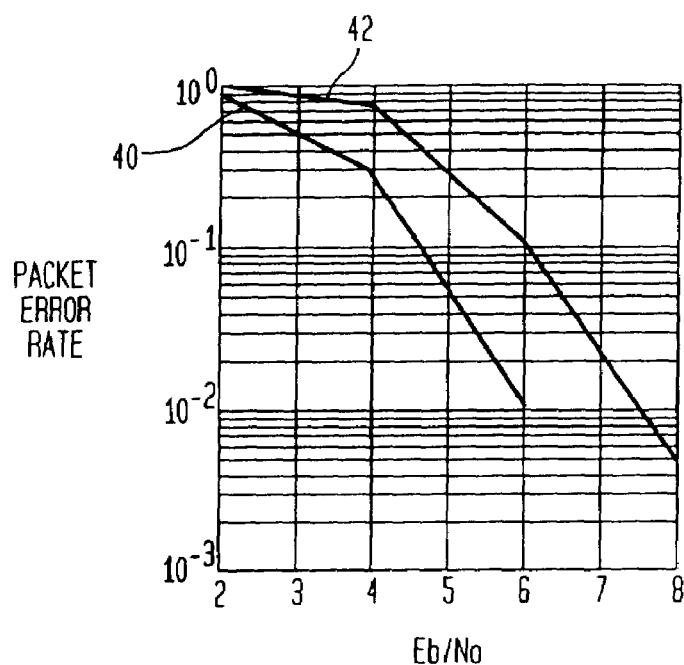
FIG. 5 shows a graphical comparison of packet error ratio versus $E_b/N_0$ in dB for the digital modulation systems of FIG. 3 and FIG. 4.

FIG. 5 graphically shows packet error rates versus $E_b/N_o$ for the system 30 using 16 11-chips codes. In fact, the $E_b/N_o$ requirement to get a certain packet error ratio is only half a dB worse than the 8 8-chip code set of the MOK system described in FIG. 1 using 8 length Walsh codes modified by a cover sequence of (11111100) as described in copending patent application Ser. No. 09/057,310 entitled "Digital Modulation System Using Modified Orthogonal Codes to Reduce Autocorrelation," filed on Apr. 8, 1998 and herein incorporated by reference. Curve 40 corresponds to a digital modulation system using 16 11-chip codes at 6 Mbps, and curve 42 corresponds to a digital modulation system using 16 11-chip codes at 10 Mbps. This shows that the 6 Mbps achieves 1.5 dB more gain than the 10 Mbps mode (curve 40 is about 1.5 dB to the left of curve 42).

Figure 6:
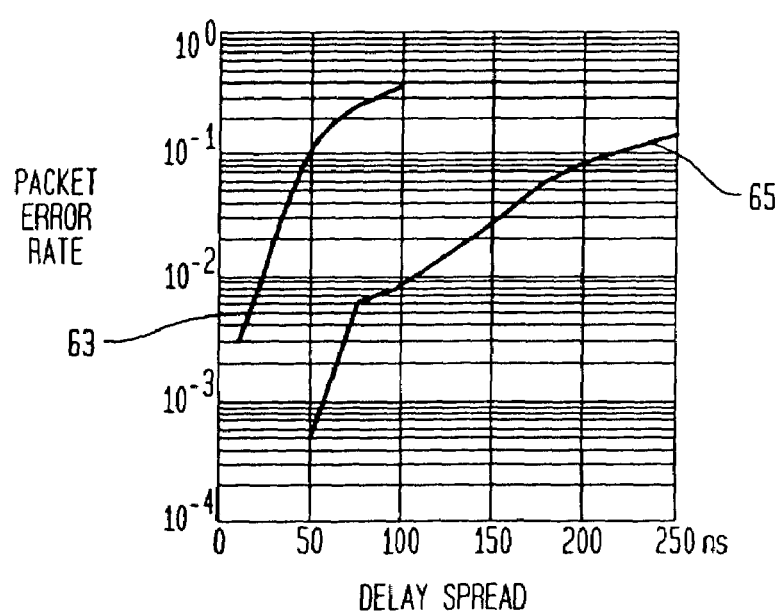
FIG. 6 shows a graphical comparison of packet error ratio versus delay spread in nanoseconds (ns) for the embodiments of FIG. 3 and FIG. 4.

FIG. 6 graphically shows packet error ratio versus delay spread in ns for a digital modulation system using 16 codes of length 11 chips with different codes on I and Q at 10 Mbps (curve 63) and using the same code on I and Q with QPSK at 6 Mbps (curve 65). The channel model used has an exponentially decaying power delay profile and independent Rayleigh fading paths. FIG. 6 shows that the 10 Mbps mode can handle a delay spread of about 50 ns using only a 6 taps channel matched filter (or a 6 finger RAKE) as would be understood by one of ordinary skill in the art. In the fallback mode of 6 Mbps (same code on I and Q), a delay spread of about 200 ns can be tolerated.

Figure 7:
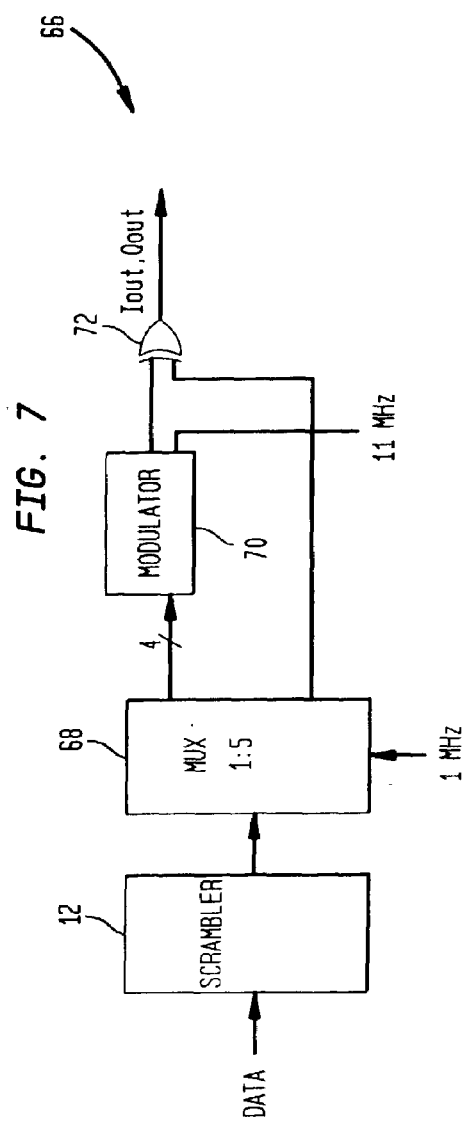
FIG. 7 shows a block diagram of another embodiment using the digital modulation system according to certain principles of the present invention.

FIG. 7 shows an embodiment of a digital modulation system 66 which can be used as a fallback mode for the system 30 (FIG. 3). The input data is scrambled by the scrambler 12 according to the IEEE 802.11 standard. The scrambled data is provided to a serial to parallel converter 68. The serial to parallel converter 68 in this embodiment produces 5 bit data symbols in parallel at a symbol rate of 1 MSps. From the 5 bit data symbol, four bits are received by a modulator 70 which encodes the 4 bits into one of 16 11-chip codes according to the principles of the present invention. The modulator 70 serially produces the length 11 codes at a rate of 11 MHz. The length 11 code is provided to an XOR gate 72 corresponding to both the I and Q branches. The length 11 code is exclusive-ored by the remaining bit of the data symbol from the serial-to-parallel converter 68 to adjust the polarity of the length 11 code and produce $I_{out}$ and $Q_{out}$ in serial form. Depending on the implementation, if −1's are used instead of 0's, the XOR gate 72 can be replaced by a multiplier. As such, given data symbols of 5 bits/symbol and a symbol rate of 1 MSps, this embodiment provides a data rate of 5 Mbps.

Figure 8:
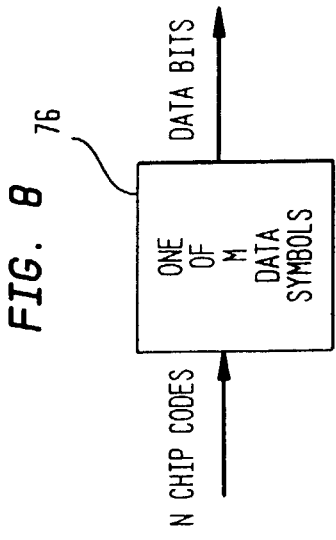
FIG. 8 shows a digital demodulator according to certain principles of the present invention.

FIG. 8 shows a digital demodulation system 76 which can be used at a receiver (not shown) to receive transmitted codes from a transmitter (not shown) using an embodiment of the digital modulation system described above. The digital demodulation system 76 receives one of 16 11-chip codes according to the principles of the present invention. In response to the code, the digital demodulation system produces a corresponding 4 data bits. Depending on the particular implementation, the code chips and/or the data bits can be in parallel or in series.

Figure 9:
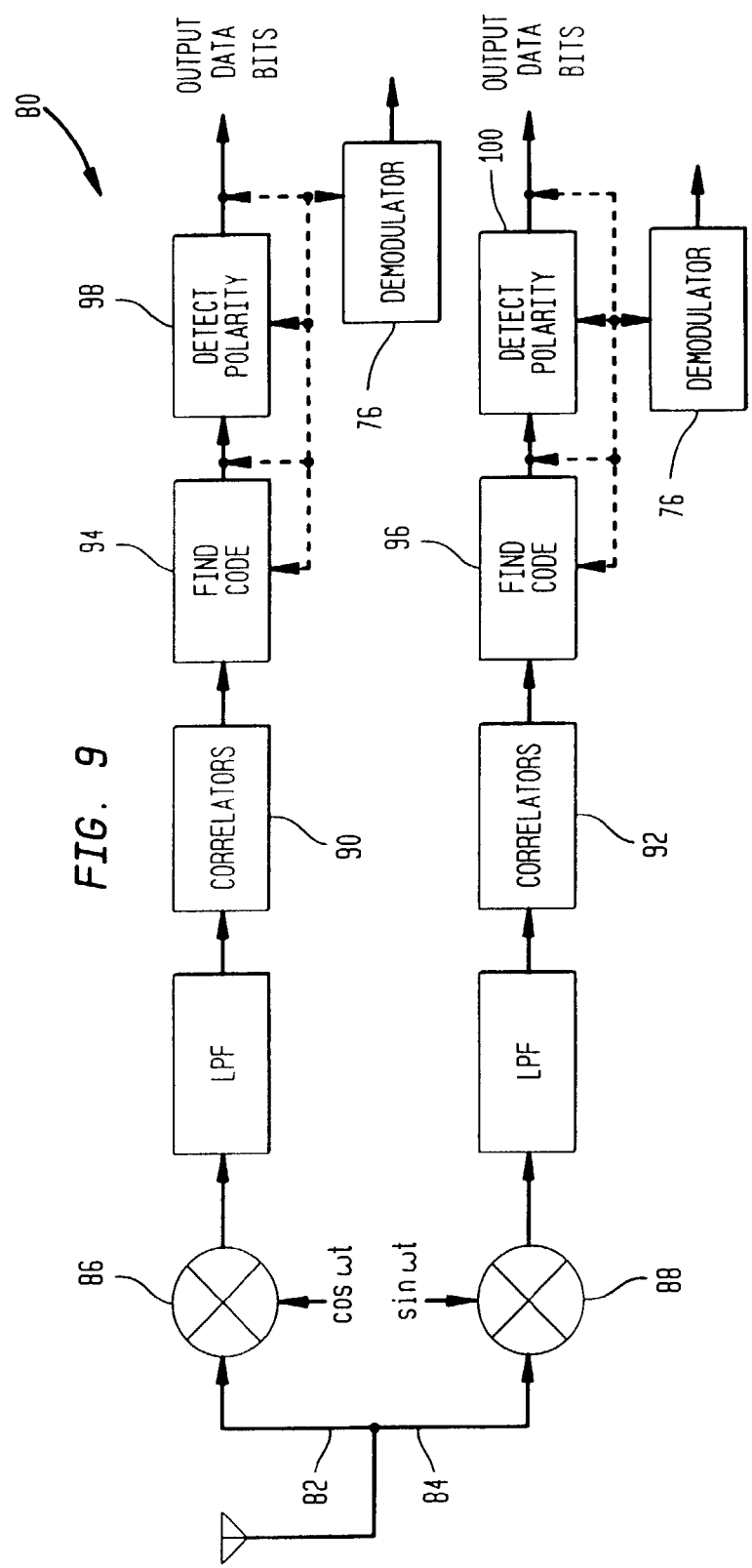
FIG. 9 shows a demodulation system using the digital demodulator according to certain principles of the present invention.

FIG. 9 shows a demodulation system 80 using the digital demodulation system according to the principles of the present invention. In this particular embodiment, the received signal is supplied to both I and Q branches 82 and 84 of the demodulation system 80. A first mixer 86 multiplies the received signal by the cost, where ω is the carrier frequency, to extract the modulated I information, and a second mixer 88 multiplies the received signal by sin (ot to extract the modulated Q information. After low pass filtering, the I and Q information are provided to correlator blocks 90 and 92, respectively. In this particular embodiment, the correlator blocks 90 and 92 each contain 16 correlators corresponding to the 16 codes in the code set for correlating time delayed versions of the I information and the Q information, respectively. The find code blocks 94 and 96 find the known codes according to the present invention which give the highest correlation magnitudes for the I and Q information. In certain embodiments, the demodulator 76 (FIG. 8) or portions thereof can be performed in or receive the output from the find code blocks 94 and 96 to decode the known codes into corresponding data bits. Depending on the embodiment, the digital demodulation system 76 (FIG. 8) or portions thereof can be implemented in the find code blocks 94 and 96, in the detect polarity blocks 98 and 100, branching off of the of the I and Q paths 82 and 84 and/or at the output of detect polarity blocks 98 and 100 to decode the codes to produce the corresponding data bits. In this embodiment, the detect polarity blocks 98 and 100 each decode an additional data bit from the polarity of the found code.

Figure 10:
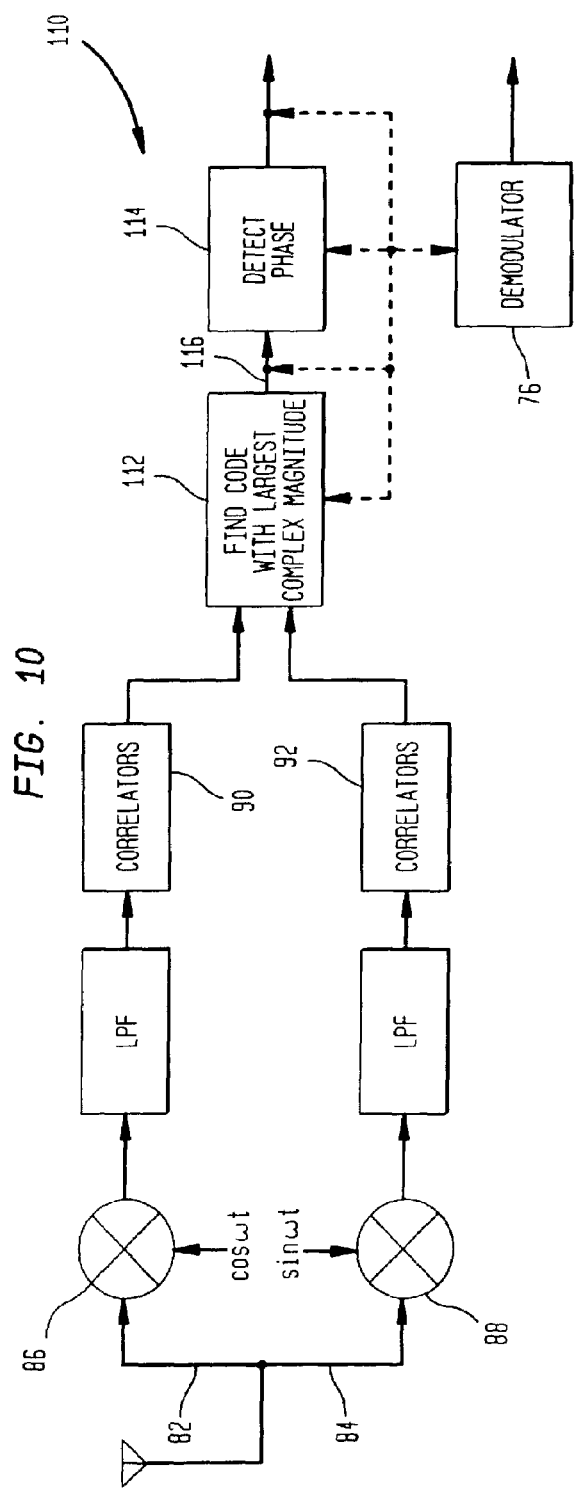
FIG. 10 shows another embodiment of a demodulation system using the digital demodulator according to the principles of the present invention.

FIG. 10 shows an embodiment of a demodulation system 110 which can be used at the fallback rate for the demodulator system 80 (FIG. 9) receiving code symbols from the modulator system 50 (FIG. 5) where the same code is transmitted on multiple modulation paths. The difference between the demodulation system 110 and the full rate demodulation system of FIG. 9 is that the code detection block 112 adds the squared correlation outputs of the I and Q correlators 90 and 92 and detects the code according to the present invention which gave the highest correlation complex magnitude. In accordance with an inventive aspect of this particular embodiment, the same code is on both the I and Q paths 82 and 84 for digital demodulation. In this particular embodiment, a block 114 finds the code with the highest complex correlation magnitude. In certain embodiments, the demodulator 76 or portions thereof can be performed in or receive the output from the find code block 112 to decode the codes into corresponding data bits. Depending on the embodiment, the digital demodulation system 76 (FIG. 8) or portions thereof can be implemented in the code detection block 112, in a phase detector 114, branching off of the path 115 and/or at the output of the phase detector 114 to decode the codes and produce the corresponding data bits. The phase detector 114 detects the phase of the complex correlation output to decode an extra 2 bits per code symbol for QPSK or an extra 3 bits per code symbol for 8-PSK.

In addition to the embodiment described above, alternative configurations of the digital (de)modulation system according to the principles of the present invention are possible which omit and/or add components and/or use variations or portions of the described system. For example, the above applications use a Quadrature Phase Shift Keying (QPSK) phase shift modulation scheme (FIG. 1, 3, 4) along with the digital (de)modulation scheme and a binary phase shift keying (BPSK) scheme (FIG. 6), but the digital (de)modulation system can be used with other (de)modulation schemes, such as amplitude modulation including quadrature amplitude modulation (QAM) and other phase modulation schemes including 8-phase shift keying (8-PSK) as would be understood by one of ordinary skill in the art. Additionally, the digital (de)modulation system has been described as using codes of 1's and 0's which are modified by codes of 1's and 0's, but the digital (de)modulation system can be performed using codes of 1's and −1's or 1's and 0's depending on the embodiment. In the embodiments described above, codes of 1's and −1's are received at the receiver, and the correlation determinations are described in terms of 1's and −1's, but the (de)modulation system can use 1's and 0's or 1's and −1's depending on the embodiment. The (de)modulation system has also been specifically described as using extended code sets of 16 11-chip codes, but other extended code sets are possible according to the principles of the present invention.

Furthermore, the digital (de)modulation system has been described using a particular configuration of distinct components, but the digital (de)modulation system can be performed in different configurations and in conjunction with other processes. Additionally, the various components making up the digital (de)modulation system and their respective operating parameters and characteristics should be properly matched up with the operating environment to provide proper operation. It should also be understood that the digital (de)modulation system and portions thereof can be implemented in application specific integrated circuits, software-driven processing circuitry, firmware, lookup-tables or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. A method for modulating information bits over a radio frequency communication channel, comprising:
   grouping a number of information bits,
   based on the grouping, selecting a code having N chips from a code set that includes M codes, wherein M>N, and wherein the selected code is derived from an orthogonal code and a complementary code, and
   modulating the phase of at least one carrier signal in accordance with the selected code.

2. The method of claim 1 further including:
   applying a phase shift to modulate at least one additional information bit on the at least one carrier signal.

3. The method of claim 2, wherein the number of information bits is six and the number of additional information bits is two.

4. The method of claim 1, wherein the phase of the at least one carrier signal is QPSK modulated in accordance with the selected code.

5. The method of claim 1, further including:
   scrambling the information bits prior to grouping.

6. The method of claim 1, wherein modulating the phase of at least one carrier signal includes In-phase and Quadrature phase modulating the at least one carrier signal.

7. The method according to claim 1, wherein the complementary code has a length of $2^X$ chips where X is a positive integer.

8. The method according to claim 1, wherein the complementary code is defined by the sequence ABAB', such that A is a sequence of elements and B is a sequence of elements and wherein B' is derived by inverting all elements in the sequence B.

9. The method according to claim 8, wherein A={1 1} and B={1 0} such that the sequence ABAB'={1 1 1 0 1 1 0 1}.

10. The method according to claim 1, wherein the complementary code provides autocorrelation sidelobes suitable for multipath environments.

11. The method according to claim 1, wherein the code set is stored in a look-up table.

12. The method according to claim 1, wherein the complementary code is characterized by the property that for shifts in the complementary code, the autocorrelations of the complementary codes sum to zero except for the main peak at zero shift.

13. The method according to claim 1, wherein the complementary code provides for a code set that has autocorrelation sidelobes which are equal to or less than one-half the length of the N chip code.

14. The method according to claim 1, wherein the complementary code is the sequence {1 1 1 0 1 1 0 1 }.

15. The method according to claim 14, wherein the orthogonal code is a Walsh code and wherein the Walsh code is modified by multiplying the Walsh code by the complementary sequence {1 1 1 0 1 1 0 1 }.

16. A method for demodulating a received signal that conveys information bits over a radio frequency communication channel, comprising:
   correlating the received signal against a code set that includes M codes, each code having N chips wherein M>N, and wherein the selected code is derived from an orthogonal code and a complementary code, and
   decoding the information bits based upon the correlating step.

17. The method according to claim 16, wherein the complementary code has a length of $2^X$ chips where X is a positive integer.

18. The method according to claim 16, wherein the complementary code is defined by the sequence ABAB', such that A is a sequence of elements and B is a sequence of elements and wherein B' is derived by inverting all elements in the sequence B.

19. The method according to claim 18, wherein A={1 1} and B={1 0} such that the sequence ABAB'={1 1 1 0 1 1 0 1}.

20. The method according to claim 16, wherein the complementary code provides autocorrelation sidelobes suitable for multipath environments.

21. The method according to claim 16, wherein the complementary code is characterized by the property that for shifts in the complementary code the autocorrelations of the complementary codes sum to zero except for the main peak at zero shift.

22. The method according to claim 16, wherein the complementary code provides for autocorrelation sidelobes in the code set which are equal to or less than one-half the length of the codes in the code set.

23. The method according to claim 16, wherein the decoding step decodes the information bits based upon the highest correlation magnitudes from the correlation step.

24. The method according to claim 16, wherein the decoding step decodes the information bits based upon the highest correlation complex magnitude from the correlation step.

25. The method according to claim 16, further comprising:
   detecting the phase of the code in the code set that generates the highest correlation magnitude, and
   decoding at least one bit per code based upon the detected phase.

26. A digital modulation system for modulating data bits, comprising:
   a serial-to-parallel converter that groups the data bits, and
   a modulator that chooses a code having N chips in response to the group of data bits, the code being a member of a code set that includes M codes, wherein M>N, and wherein the code set is derived from an orthogonal code and a complementary code.

27. The digital modulation system according to claim 26, further comprising a mixer that modulates a carrier signal in accordance with the chosen code.

28. The digital modulation system according to claim 27, wherein the mixer modulates the phase of at least one carrier signal in accordance with the selected code.

29. The digital modulation system according to claim 28, wherein the phase of the at least one carrier signal is QPSK modulated in accordance with the selected code.

30. The digital modulation system according to claim 26, further comprising a scrambler for scrambling the group of data bits.

31. The digital modulation system according to claim 26, wherein the complementary code is defined by the sequence ABAB', such that A is a sequence of elements and B is a sequence of elements and wherein B' is derived by inverting all elements in the sequence B.

32. The digital modulation system according to claim 31, wherein A={1 1} and B={1 0} such that the sequence ABAB'={1 1 1 0 1 1 0 1}.

33. The digital modulation system according to claim 26, wherein the complementary code provides autocorrelation sidelobes suitable for multipath environments.

34. The digital modulation system according to claim 26, further comprising a look-up table for storing the code set.

35. The digital modulation system according to claim 26, wherein the complementary code is characterized by the property that for shifts in the complementary code, the autocorrelations of the complementary codes sum to zero except for the main peak at zero shift.

36. The digital modulation system according to claim 26, wherein the complementary code provides for autocorrelation sidelobes in the code set which are equal to or less than one-half the length of the N chip code.

37. A digital modulation system for modulating a group of data bits, comprising:
   a scrambler for scrambling the group of data bits, and
   a modulator that chooses a code having N chips in response to the group of data bits, the code being a member of a code set that includes M codes, wherein M>N, and wherein the code set is derived from an orthogonal code and a complementary code.

38. The digital modulation system according to claim 37, wherein the complementary code is defined by the sequence ABAB', such that A is a sequence of elements and B is a sequence of elements and wherein B' is derived by inverting all elements in the sequence B.

39. The digital modulation system according to claim 38, wherein A={1 1} and B={1 0} such that the sequence ABAB'={1 1 1 0 1 1 0 1}.

40. The digital modulation system according to claim 37, wherein the complementary code provides autocorrelation sidelobes suitable for multipath environments.

41. The digital modulation system according to claim 37, further comprising a look-up table for storing the code set.

42. The digital modulation system according to claim 37, wherein the complementary code is characterized by the property that for shifts in the complementary code, the autocorrelations of the complementary codes sum to zero except for the main peak at zero shift.

43. The digital modulation system according to claim 37, wherein the complementary code provides for autocorrelation sidelobes in the code set which are equal to or less than one-half the length of the N chip code.

44. A digital demodulator for demodulating a received signal that conveys information bits over a radio frequency communication channel, comprising:
   a correlator block for correlating the received signal against a code set that includes M codes, each code having N chips wherein M>N, and wherein the code set is derived from an orthogonal code and a complementary code, and
   a find code block for decoding the information bits based upon the correlations of the received signal and the code set.

45. The digital demodulator according to claim 44, wherein the complementary code is defined by the sequence ABAB', such that A is a sequence of elements and B is a sequence of elements and wherein B' is derived by inverting all elements in the sequence B.

46. The digital demodulator according to claim 45, wherein A={1 1} and B={1 0} such that the sequence ABAB'={1 1 1 0 1 1 0 1}.

47. The digital demodulator according to claim 44, wherein the complementary code provides autocorrelation sidelobes suitable for multipath environments.

48. The digital demodulator according to claim 44, wherein the complementary code is characterized by the property that for shifts in the complementary code the autocorrelations of the complementary codes sum to zero except for the main peak at zero shift.

49. The digital demodulator according to claim 44, wherein the complementary code provides for autocorrelation sidelobes in the code set which are equal to or less than one-half the length of the N chip code.

50. The digital demodulator according to claim 44, further comprising a phase detector that detects the phase of the code in the code set that generates the highest correlation magnitude and that decodes an extra 2 bits per code based upon the detected phase.

51. The digital demodulator according to claim 44, wherein the orthogonal code is a Walsh code and wherein the Walsh code is modified by multiplying the Walsh code by a complementary sequence {1 1 1 0 1 1 0 1}.

52. The digital demodulator according to claim 44, further comprising an antenna for receiving a radio signal from the radio frequency channel.

53. The digital demodulator according to claim 46, further comprising an antenna for receiving a radio signal from the radio frequency channel.

54. The digital demodulator according to claim 52, further comprising a mixer operably coupled with the antenna, wherein the mixer extracts the modulated information from the radio signal received by the antenna.

55. The digital demodulator according to claim 54, further comprising a filter operably coupled to the mixer, wherein the filter filters the output of the mixer.

56. The digital demodulator according to claim 44, wherein the find code block decodes the information bits based upon the highest correlation magnitude output by the correlator block.

57. The digital demodulator according to claim 44, wherein the find code block decodes the information bits based upon the largest complex magnitude output by the correlator block.

58. The method according to claim 1, wherein the selecting step includes the step of calculating the code set using processing circuitry.

59. The digital modulation system according to claim 34, wherein the look-up table stores different sets of codes for changes in operation.

60. The digital modulation system according to claim 26, wherein the modulator includes processing circuitry for calculating the code set.

61. The digital modulation system according to claim 41, wherein the look-up table stores different sets of codes depending on changes in operation.

62. The digital modulation system according to claim 37, wherein the modulator includes processing circuitry for calculating the code set.

* * * * *